United States Patent [19]

Crookes

[11] 4,410,281

[45] Oct. 18, 1983

[54] MIXING METHOD AND APPARATUS UTILIZING PIPE ELBOWS

[75] Inventor: LeRoy W. Crookes, East Brunswick, N.J.

[73] Assignee: Ralph B. Carter Company, Hackensack, N.J.

[21] Appl. No.: 239,568

[22] Filed: Mar. 2, 1981

[51] Int. Cl.³ .............................................. B01F 5/00
[52] U.S. Cl. .................................... 366/341; 366/348; 366/349; 138/178; 138/DIG. 11
[58] Field of Search ............... 366/336, 341, 348, 349, 366/340, 3, 5, 10; 138/39, 118, 178, DIG. 11; 285/120, 169, 179, 184

[56] References Cited

U.S. PATENT DOCUMENTS 2,450,195  9/1948  Grantham ...................... 285/169 X
3,223,121 12/1965  Lee ................................... 366/340 X Primary Examiner—Philip R. Coe
Assistant Examiner—Joseph M. Pitko
Attorney, Agent, or Firm—Posnack, Roberts, Cohen & Spiecens

[57] ABSTRACT

A mixing apparatus and associated method comprising a system for supplying a first substance of liquid constitution and a system for supplying a second substance to an assembly of pipe elbows to effect mixing and transport of the substances along the assembly. The pipe elbows are right angle elbows connected one after the other in groups of three. Each group has an inlet and an outlet disposed in parallel planes and axially offset from one another. The pipe elbows in each group have center lines disposed in mutually perpendicular planes to cause the mixture to rotate as it travels along the pipe elbows.

14 Claims, 8 Drawing Figures

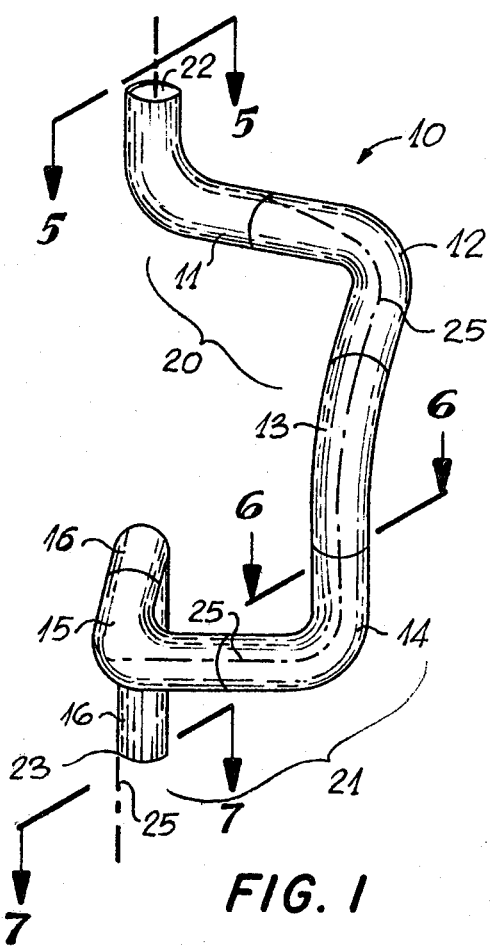
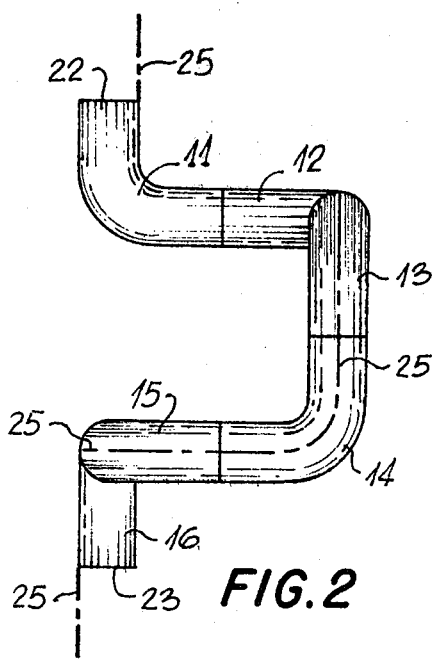
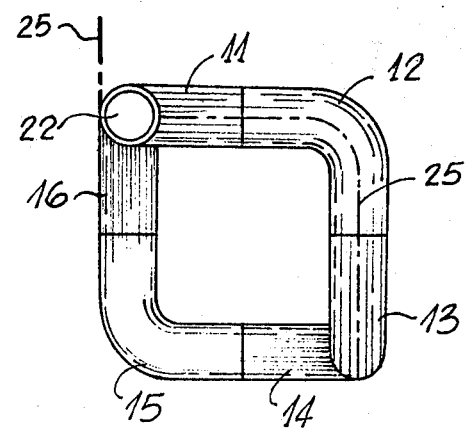
FIG. 1
FIG. 2
FIG. 3

MIXING METHOD AND APPARATUS UTILIZING PIPE ELBOWS

FIELD OF THE INVENTION

The invention relates to mixing methods and apparatus in which two substances are conveyed and mixed. In particular, the substances can be sewage sludge and a flocculant such as a polymer. The invention is particularly concerned with a method and apparatus by which the substances are mixed while being conveyed and wherein pipe elbows are employed to effect the mixing and conveyance.

PRIOR ART

It is well known to convey fluids through pipes and to employ pipe elbows in the hydraulic circuit through which mixing of substances in the fluid will take place.

U.S. Pat. No. 2,025,974 (Fritz) discloses a mixing nozzle inclusive of a plurality of bend portions. The mixing passage is of zig-zag formation to provide a tortuous path for the material travelling therethrough.

U.S. Pat. No. 2,213,640 (Stone) shows a mixing structure in FIGS. 5 and 10 which is comparable to that in the aforesaid Fritz Patent.

U.S. Pat. No. 2,862,522 (Yost) discloses means for inducing spiraling movement of liquid passing through a pipe.

U.S. Pat. No. 2,889,174 (Schwing) discloses equipment for conveying pulpy or plastic materials and in FIG. 12 discloses a pipeline which is given a profiled section to cause revolution of a concrete plug passing through the pipe.

U.S. Pat. No. 3,719,207 (Takeda) discloses a helical protrusion on the internal surface of a pipe causing fluid in the pipe to rotate about the longitudinal axis of the pipe.

U.S. Pat. No. 3,779,519 (Anderson et al) shows a conical mixer in FIGS. 4 and 5 in which mixing is effected by a vortex action. This patent is also relevant for the disclosure of a pipe system having pipe elbows therein.

U.S. Pat. No. 3,847,184 (God) discloses a pipe for conveyance of a fluid along a nonlinear path with alternating cylindrical and flexible portions along its length to enable the pipe to be shaped into a nonlinear configuration along the flexible portions.

SUMMARY OF THE INVENTION

An object of the invention is to provide mixing apparatus which utilizes pipe elbows in a particular configuration to effect mixing of substances passing through the elbows.

A further object of the invention is to employ the pipe elbows in such a way as to produce rotation of the substances passing through the elbows to effect such mixing.

A further object of the invention is to utilize the pipe elbows as the sole means to effect the mixing of the conveyed substances.

Another object is to provide mixing apparatus which effects rotational circulation of the substances to be mixed without any internal vanes, paddles or other mixing means. Thereby, no unfavorable accumulation of solids will be produced.

Yet another object of the invention is to dispose the elbows such as to convey the substances to be mixed from an upper level to a lower level. In this way, flow and mixing can be assisted by the effects of gravity.

A specific object of the invention is to provide mixing apparatus utilizing pipe elbows in which sewage sludge can be mixed with a flocculant such as a polymer.

In order to achieve the above and other objects of the invention, there is provided a plurality of pipe elbows connected one after the other and through which first and second substances travel and undergo mixing, said pipe elbows having bend angles which are successively turned in different directions to lie out of a common plane and cause the mixture to rotate as it travels through the elbows. Hence, each axial streamline of the mixture in the cross-sectional flow path at an inlet end is angularly rotated in the cross-sectional flow path at the outlet end.

In a constructional arrangement which represents a feature of the invention, the pipe elbows are right angle elbows and are arranged in groups of three whose center lines are disposed in mutually perpendicular planes. The inlet and outlet of the assembled three elbows are disposed in parallel planes but are axially offset from one another. In the course of travel through the three elbows, the mixture is rotated through an angle of 90°. By assembling four sets of three elbow units, the mixture can be rotated through 360°. Furthermore, by using an even number of elbow units, the outlet of the assembly can be made to be aligned coaxially with the inlet.

It is a further object of the invention to provide a method of mixing two substances by causing the substances to flow along a path of travel defined by the pipe elbows as recited above. In this way the substances are turned through successive bend angles while travelling along the path of flow and undergo rotation in the flow cross-section.

In a specific aspect of the method of the invention, the substances to be mixed are turned through successive bend angles in different planes which are mutually at right angles to one another.

BRIEF DESCRIPTION OF THE SEVERAL VIEWS OF THE DRAWING

FIG. 1 is a perspective view of a mixing apparatus according to the invention.

FIG. 2 is a side elevational view of the mixing apparatus.

FIG. 3 is a top plan view of the mixing apparatus.

DETAILED DESCRIPTION

Figure 4:
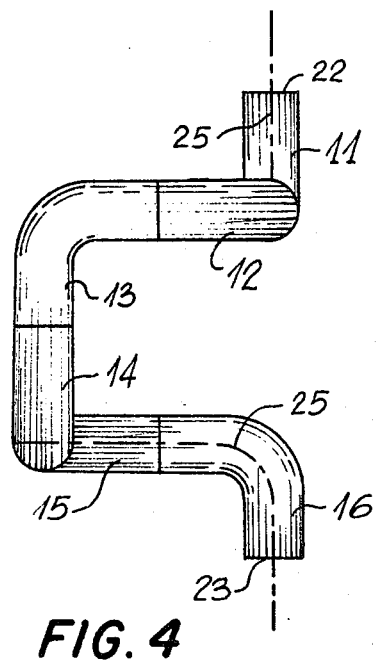
FIG. 4 is a front elevational view of the mixing apparatus.

Referring to FIGS. 1-4, therein is seen a mixing apparatus 10 which is composed of a plurality of identical pipe elbows 11-16. Each of the pipe elbows has a right angle bend and, therefore, has respective open ends which lie in perpendicular planes. Although six pipe elbows have been shown, it will be seen that the mixing apparatus can include more or less than this number.

Basically, the mixing apparatus is composed of a succession of pipe elements which are connected in groups of three. Thus, pipe elbows 11–13 in group 20 are arranged so that their center lines lie in mutually perpendicular planes, i.e., in planes which are perpendicular to one another. Similarly, the pipe elbows 14–16 of group 21 have center lines which lie in mutually perpendicular planes.

The mixing apparatus 10 has an inlet 22 and an outlet 23 and in the arrangement of the pipe elbows as shown, the inlet and outlet are coaxially arranged wherein the inlet 22 is at a level above the outlet 23. At the inlet 22 the substances to be mixed are introduced and in the particular circumstances of the construction, it is contemplated that sludge and flocculant will be introduced at inlet 22 so as to be mixed in the course of its travel through the pipe elbows to be discharged as a flocculated sludge. As shown, the sludge and flocculant are introduced axially although it is equally possible for the flocculant to be introduced laterally in an optional arrangement.

As shown in FIG. 1, the pipe elbows are arranged in vertical array with the inlet 22 at a level about the outlet 23 whereby mixing will be assisted by the effect of gravity in the downward flow of the substances. However, it is not necessary for the pipe elbows to be vertically arranged and the mixing effect will take place in any position of the pipe elbows.

Heretofore, it has been the conventional practice to introduce the sludge and flocculant into a mixer which controls the rate of flow of the sludge and flocculant. Since the mixing apparatus 10 of the invention employs pipe elbows which serve to convey the sludge and flocculant, there is effectively no substantial detention time which controls the rate of feed of the sludge and flocculant. Moreover, the need for special mixing apparatus is obviated. The pipe elbows of the mixing apparatus can be constructed of any suitable material such as metal, plastic and the like.

Next will be considered the pattern of flow of the sludge and flocculant as it travels through the three elbows 11–13 of group 20. This will be typical of the flow pattern through each group of three elbows.

Figure 5:
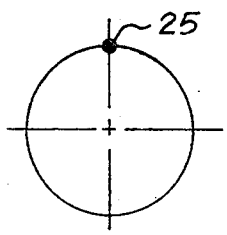
FIG. 5 is a diagrammatic sectional view taken along line 5—5 in FIG. 1.
Figure 6:
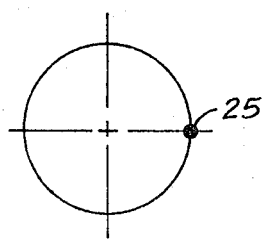
FIG. 6 is a diagrammatic sectional view taken along line 6—6 in FIG. 1.
Figure 7:
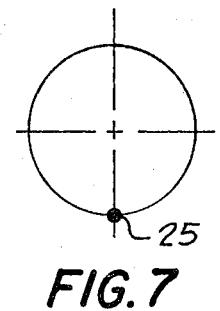
FIG. 7 is a diagrammatic sectional view taken along line 7—7 in FIG. 1.

The mixture flows from the inlet 22 of elbow 11 and travels along a path in which the bend lies in a vertical plane. The mixture then passes into elbow 12 where the bend lies in a horizontal plane. Thereafter the mixture then flows through elbow 13 where the mixture travels in a vertical plane at right angles to the vertical plane through the center line of elbow 11. Thus, the mixture travels through successive elbows 11–13 whose center lines are located in planes which are mutually perpendicular to one another. As a consequence of this course of travel, the streamlines of the flow path are successively lengthened and shortened causing changes of velocities of the streamlines to produce a mixing operation. Furthermore, each of the streamlines undergoes a rotation of 90° in travelling from the inlet of elbow 11 to the outlet of elbow 13. In this regard, the streamline designated at 25 in FIG. 5 is located at a position at the outlet of elbow 13 which is displaced 90° in the clockwise direction. The orientation of the streamline along elbows 11, 12 and 13 is shown in chain-dotted outlines in FIGS. 1–4. In the course of travel through the three elbows 14–16 of group 21, the streamlines each undergo a further rotation of 90° as shown by streamline 25 in FIG. 7. Hence, there is 180° rotation of the flow cross-section in its transport from inlet 22 to inlet 23. If a further succession of groups are attached at 23 for successive conveyance of the mixture, the flow cross-section can be made to rotate through greater angles. When four groups of three elbows are employed, the flow cross-section undergoes a 360° rotation. Furthermore, it is evident that the inlet at the top of the mixing apparatus 10 can be brought into axial alignment with the outlet at the bottom of the mixing apparatus when an even number of groups of three pipe elbows are utilized. In this regard, it should be noted that in each group, the inlet and outlet will lie in planes which are parallel to one another but axially offset.

Figure 8:
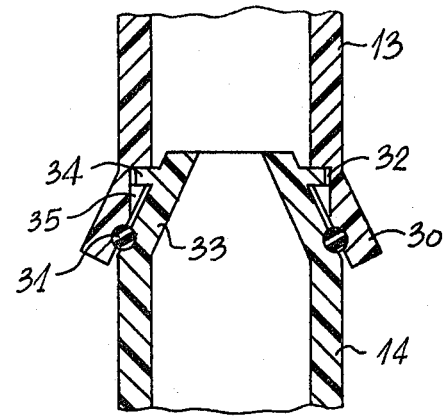
FIG. 8 is a sectional view on enlarged scale showing a coupling arrangement between the ends of two pipe elbows.

In order to enable each group to be connected to a successive group, the inlet and outlet ends of each group will be formed to enable a quick connection and release. An assembly is shown in FIG. 8 where the inlet end of elbow 14 is connected to the outlet end of elbow 13. Herein it can be seen that the outlet end of elbow 13 has a flared end 30 in which an O-ring seal 31 is supported in its interior surface. A circumferential slot 32 is formed within the inner surface of end 30. The inlet of elbow 14 is formed as a male end 33 which is of tapering conical shape for insertion into the end 30 of elbow 13. The end 33 is provided with bayonet portions 34 which fit into circumferential slot 32 via axial slots 35 corresponding in number and placement to bayonet portions 34. Connection is made by inserting the end 33 of elbow 14 into the end 30 of elbow 13 to seal the two ends by seal 31 and elbow 14 is then rotated to lock the bayonet portions 33 in the slot 32.

Although the invention has been described in relation to the mixing of two substances introduced separately at the inlet of the mixing apparatus, it is equally possible to introduce a single fluid substance at the inlet which is to undergo mixing as it travels through the pipe elbows.

DESCRIPTION OF PARTICULAR EMBODIMENTS

In a particular embodiment, the invention is employed to mix a polymer with a liquid sludge. The sludge has a solids concentration of 0.1 to 22% and is fed at a rate between 25 and 200 gpm. A polymer solution of a flocculant having a dry solids concentration of 0.05–2% is fed at a rate between 1 and 15% volumetrically of the feed rate of the sludge. The sludge and flocculant solutions pass through a vertical array of 12 pipe elbows consisting of four groups of elbows each with three elbows arranged in mutually perpendicular relation. At the outlet of the elbows, the sludge and flocculant are thoroughly and uniformly mixed. Each of the pipe elbows is composed of PVC and has a pipe diameter between two and three inches. The pipe elbows are 90° long sweep elbows and in each group are adhesively joined at their ends to form a smooth, unbroken, inner passageway without vanes, paddles, grooves, etc. Each group of three elbows is connected to the next by means of flanges which are secured to the end elbows and are bolted together. The flanges serve as a connect and release means for each of the groups of three elbows.

The mixture of sludge and flocculant is fed to an aging vessel in which the mixture has a detention time of the order of one to three minutes. The effectiveness of the mixing of the sludge and polymer in the pipe elbow mixing apparatus is indicated by the degree of flocculation of the sludge which is discharged from the aging vessel. With the pipe elbow mixing apparatus of the invention, it is found that the degree of flocculation is substantially complete and is at least as great as that obtained by using complex and expensive mixing apparatus.

When other substances are to be mixed or a single substance is to undergo mixing or agitation, it may be possible to use more or less numbers of groups of three pipe elbows.

The use of three elbows in each unit has the further advantage that cleaning of each unit can be easily effected from both of the unit ends over 1½ bends. This can be achieved by brushes or other suitable means.

Although the invention has been described in relation to a specific embodiment thereof, it will become apparent to those skilled in the art that numerous modifications and variations can be made within the spirit and scope of the invention as defined in the attached claims.

What is claimed is:

1. Mixing apparatus comprising means for supplying sludge as a first substance of fluid constitution, means for supplying flocculant as a second substance, and means for receiving said first and second substances to mix the same while advancing the substances along a path of travel to produce a mixture of said flocculant and said sludge, the latter means comprising an assembly of three pipe elbows connected one after the other and through which said substance travels and undergoes mixing, each of said pipe elbows having a smooth unobstructed inner surface, said assembly of pipe elbows having an inlet and outlet disposed in parallel planes axially offset from one another, said three pipe elbows being substantially identical right angle elbows and further having center lines disposed substantially in mutually perpendicular planes and bend angles which are successively turned in different directions to cause each axial streamline in the cross-sectional flow path of the flocculant, sludge mixture to undergo successive velocity changes while concurrently undergoing angular rotation in the cross-sectional flow path to effect mixing of the sludge and flocculant without internal obstructions in said elbows and provide said mixture of flocculant and sludge at said outlet.

2. Mixing apparatus as claimed in claim 1 wherein said streamlines of the mixture are rotated through an angle of 90° from said inlet to said outlet.

3. Mixing apparatus as claimed in claim 1 wherein each group of three elbows having an inlet and outlet including quick release means for connection with another group.

4. Mixing apparatus as claimed in claim 1 wherein said first substance supplying means supplies said first substance axially at said inlet of the elbows.

5. Mixing apparatus as claimed in claim 4 wherein said second substance supplying means supplies a second substance axially at said inlet of the elbow.

6. Mixing apparatus as claimed in claim 4 wherein said second substance supplying means supplies said second substance transversely of said inlet of the elbow.

7. Mixing apparatus as claimed in claim 1 wherein said bend angles of said elbows are disposed in successively different planes.

8. Mixing apparatus as claimed in claim 7 wherein the planes containing the bend angles of the first and third elbows are perpendicular to the plane containing the bend angle of the second elbow.

9. Mixing apparatus as claimed in claim 1 wherein said inlet is at a level above said outlet.

10. A method of effecting mixing of a substance of liquid composition comprising introducing said substance at an inlet and advancing the substance along a path of travel to effect mixing of the substance and turning said substance through successive bend angles in different planes while traveling along said path to flow through an outlet parallel to said inlet and axially offset therefrom by conveying the mixture through an assembly of three substantially identical right angle elbows disposed in mutually perpendicular planes and through which the substance flows without obstruction such that axial streamlines in the flow cross-section of the substance undergo successive and different velocity changes while also undergoing successive rotation in said flow cross-section.

11. A method as claimed in claim 10 wherein said substance comprises sludge and flocculant.

12. A method as claimed in claim 11 wherein the sludge and flocculant are substantially uniformly mixed at said outlet.

13. A method as claimed in claim 10 wherein said substance flows from an upper elevation at said inlet to a lower elevation at said outlet.

14. A method as claimed in claim 10 wherein the planes containing the first and third elbows are vertical and the plane containing the intermediate second elbow is horizontal.

* * * * *